Feb. 7, 1939. C. PIERCE 2,146,649
FASTENER
Filed Jan. 25, 1938

WITNESS
H. Woodard

Inventor
Carl Pierce

H. B. Wilson & Co.
Attorneys

Patented Feb. 7, 1939

2,146,649

UNITED STATES PATENT OFFICE 2,146,649

FASTENER

Carl Pierce, Chippewa Falls, Wis.

Application January 25, 1938, Serial No. 186,877

2 Claims. (Cl. 85—5)

The invention relates to a new and improved fastener in the nature of a bolt designed primarily for fastening automobile license plates to their supporting brackets, although not restricted to this particular field of use.

The object of the invention is to provide an exceptionally simple and inexpensive fastener which may be quickly and easily applied or removed, which will securely hold the license plate or other member in place in an anti-rattling manner, and will require no nut or screw thread.

With the foregoing in view, the invention resides in the novel subject matter hereinafter described and claimed, description being accomplished by reference to the accompanying drawing.

Figure 1:
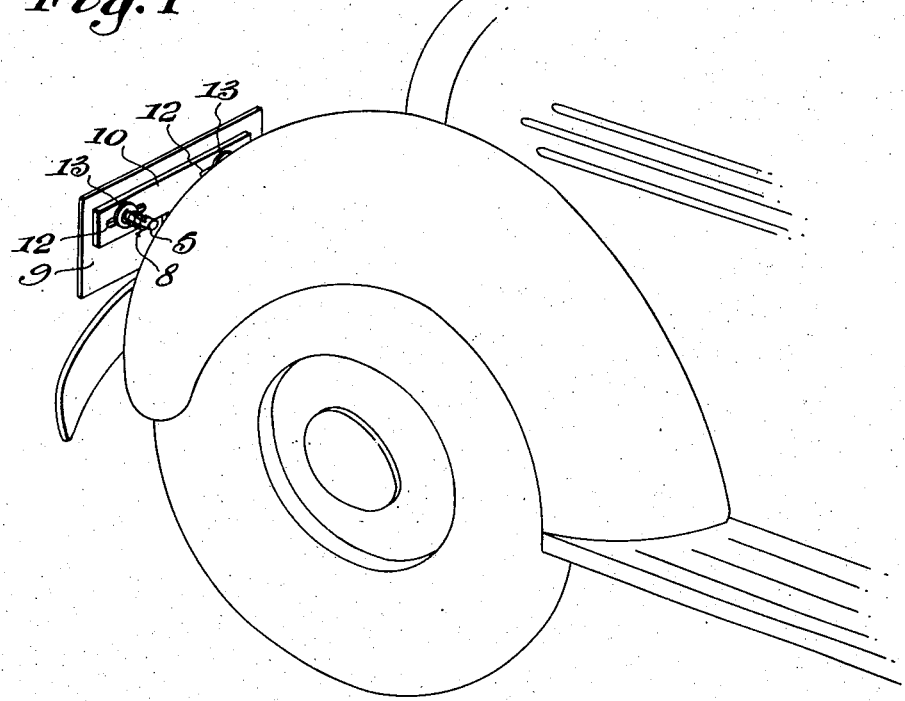
Fig. 1 is a perspective view of a portion of an automobile, and its front license plate and bracket, showing the invention in use.
Figure 2:
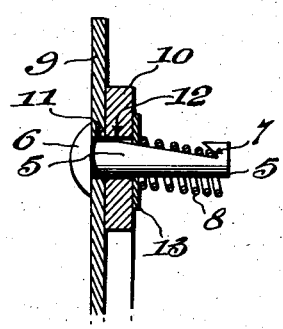
Fig. 2 is an enlarged detail sectional view on line 2—2 of Fig. 1.
Figure 3:
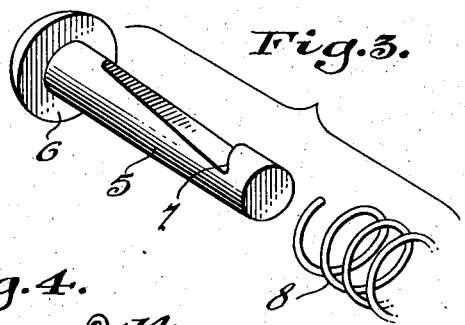
Fig. 3 is a disassembled perspective view.
Figure 4:
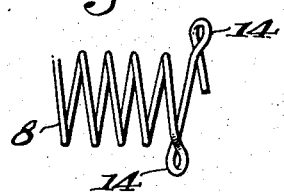
Fig. 4 is a detail side elevation showing a modification.

The improved fastener includes a pin 5 having an integral head 6 on one end, said pin being provided at its other end with a transverse undercut shoulder 7 which faces toward said head, said shoulder being preferably formed by filing or otherwise cutting away a longitudinal side portion of the pin. A conventional coiled compression spring 8 is provided to surround the pin 5, one of the endmost convolutions of said spring being engageable, at one side of the spring axis, with the shoulder 7, holding said spring under compression in a canted position, as seen in Fig. 2. By relieving the compression of the spring 8 and moving said spring into coaxial relation with the pin 5, it may be easily withdrawn from said pin, allowing removal of the latter from the parts which it secures together.

The invention is shown for the purpose of securing an automobile license plate 9 against the bracket 10. When so used, the pin 5 is passed through the usual slots or openings 11 and 12 in the plate and bracket, a washer 13 is then placed on said pin against the bracket, and the spring 8 is then slipped over the pin, compressed and engaged with the shoulder 7. The compression of the spring effectively draws all of the parts into tight contact with each other and holds them against rattling, and said compression also holds the spring engaged with the shoulder 7.

If desired, the spring 8 may be provided with finger-pieces 14 for use when engaging said spring with or disengaging it from the shoulder 7.

From the foregoing taken in connection with the accompanying drawing, it will be seen that novel and advantageous provision has been made for carrying out the object of the invention, and while preferred details have been shown, it will be obvious that variations may be made within the scope of the invention as claimed.

I claim:—

1. A fastener of the class described comprising a cylindrical pin having an integral head on one end, a longitudinal side portion of said pin being cut away between the head and the other end of the pin to provide the latter with a longitudinally inclined side and to leave said other end of the pin projecting laterally from said inclined side, the inner extremity of this laterally projecting portion being undercut to provide a transverse undercut shoulder, and a conventional coiled compression spring surrounding said pin and having one of its endmost convolutions directly abutting said undercut shoulder at one side of the spring axis, holding said spring under compression in a canted position.

2. A fastener for securing a plurality of members together, comprising a pin passing through said members and having an integral head on one end abutting one of said members, the other end of said pin projecting beyond another of said members and being provided with a transverse undercut shoulder spaced from and facing said other member, and a conventional coiled spring surrounding said projecting portion of said pin, one of the endmost convolutions of said spring being disposed against said other member, the other endmost convolution of said spring being directly engaged with said undercut shoulder at one side of the spring axis, holding said spring under compression in a canted position.

CARL PIERCE.